United States Patent Office 3,538,054
Patented Nov. 3, 1970

3,538,054
LOW ADHESION SURFACE COATINGS OF A MELAMINE RESIN AND SUBSTITUTED FLUORENE SUCCINIC ACID-(9)
Hans-Werner Demmig and Kurt Rehnelt, Dusseldorf-Holthausen, Germany, assignors to Henkel & Cie, G.m.b.H., Dusseldorf-Holthausen, Germany, a corporation of Germany
No Drawing. Filed Mar. 12, 1968, Ser. No. 712,380
Claims priority, application Germany, Mar. 15, 1967, H 62,138
Int. Cl. C08g 37/32, 9/30
U.S. Cl. 260—67.6                                     2 Claims

ABSTRACT OF THE DISCLOSURE

Compositions for forming low adhesion surface coatings on cellulose-containing materials wherein the coating agent is a melamine-urea-lower alkyl aldehyde resin etherified with a lower alkyl polyol and an imide or diamide of fluorene succinic acid-(9) wherein the imide or amide nitrogen is directly bonded to a monovalent aliphatic or cycloaliphatic hydrocarbon radical of 5 to 22 carbon atoms.

---

Surface coatings of cellulose-containing tapes having a lower adhesion than that of pressure sensitive adhesives are useful for coating the reverse sides of adhesive tapes, particularly when sold in rolls. The said coatings have to be effective in relatively small amounts, should not diffuse into the adhesive and should be capable of being easily bonded to the base material. German Pat. No. 969,597 discloses low adhesion surface coatings prepared from polymers of vinyl esters of higher fatty acids of not more than 16 carbon atoms. However, these coatings have a relatively low affinity for cellulose and are apt to become separated from the base material and diffuse into the adhesive itself. Organic polyisocyanurates have been added thereto to eliminate these disadvantages but the use of organic polyisocyanurates has considerable disadvantages in processing due to their moisture sensitivity and possible toxic properties.

OBJECTS OF THE INVENTION

It is an object of the invention to provide novel compositions for forming low adhesion coatings on cellulose-containing material which will firmly adhere thereto.

It is another object of the invention to provide novel low adhesion coated cellulose containing materials useful as a base for pressure sensitive adhesive types.

These and other objects and advantages of the invention will become obvious from the following detailed description.

THE INVENTION

The novel coating compositions of the invention are compositions containing at least one compound selected from the group consisting of imides and amides of fluorene succinic acid-(9) having at least one nitrogen substituent selected from the group consisting of aliphatic and cycloaliphatic of 5 to 22 carbon atoms. The said coating compositions usually contain an inert organic solvent or water for easy application.

The imides or amides of fluorene succinic acid-(9) may be prepared by the usual methods of producing them such as by reaction of the free acid, its anhydride or halide with the appropriate amine. Fluorene succinic acid-(9) may be prepared by reaction of maleic acid anhydride and fluorene as described in Chemische Berichte, vol. 95, 1962, p. 3017.

For the preparation of the imides, the said acid derivative and a primary amine may be reacted in substantially equimolar amounts in a molten form for 3 to 12 hours at a temperature of 120 to 250° C. The amides may be formed by the same process using a primary or secondary amine with at least 2 moles of amine per mole of acid. Solvents may also be used, particularly in the preparation of the amides. Examples of suitable inert organic solvents are toluene, xylene, cumene, cymene, tetrahydronaphthalene, methyl naphthalene, etc.

Examples of suitable amines for the preparation of the amides and imides are aliphatic and cycloaliphatic amines having 5 to 22 carbon atoms, such as cyclopentylamine; cyclohexylamine; N-lower alkyl cyclopentylamines and cyclo hexylamines; pentylamine; hexylamine; isomers of decylamine, dodecylamine, tetradecylamine, hexadecylamine, octadecylamine and docosylamine; dialkyl amines such as dibutylamine, N-methyl octadecylamine; mixtures of amines derived from natural fatty acids, etc. Amines having a terminal primary amine grouping are preferred.

The said imides and amides of fluorenesuccinic acid-(9) are usually solids and may be purified by recrystallization from alkanols such as ethanol, isopropanol, etc., or hydrocarbons such as toluene, xylene, etc. or ethers such as dioxane.

The said amides or imides of fluorene succinic acid-(9) may be used as such to form the coatings on cellulose containing materials, but are preferably added in small amounts to coating compositions having a modified melamine resin base. Examples of suitable melamine resins are those formed by condensing one mole of melamine with 4 to 7 moles of formaldehyde and 0.5 to 1.5 moles of urea and modifying the resulting resin with 1 to 2 moles of polyol such as ethyleneglycol, diethylene glycol, trimethylol propane, etc. Also, up to one-third of the said resin may be replaced by a melamine resin etherified with a lower alkyl monoalcohol. Preferably, the coating agent contains about 0.5 to 10 parts by weight of the imide or amide of fluorene succinic acid per 100 parts by weight of the melamine resin.

The compositions of the invention can be utilized as such for the preparation of surface coatings, or they can be dispersed in water. The solutions or dispersions in water can be applied in well-known manner onto cellulose-containing base materials. For example, the application may be effected by rolling on, painting on, brushing on or spraying on. If so desired, the water or the solvent may then be evaporated, for example by heating to temperatures of about 80°–150° C. The amount of the adhesive repelling composition to be applied is preferably between 10 to 100 gm./m.$^2$, preferably 20 to 50 gm./m.$^2$ of cellulose material.

The surface coatings of the invention are distinguished by their glossy appearance, and in contrast to silicone films, they can be written upon such as with a ball point pen. The coated papers usually have a higher resistance against tearing due to the coating. Because of the strong adhesion of the coatings, in particular to paper, no diffusion into the pressure sensitive adhesive occurs when the coated paper is rolled. The low adhesion surface coatings of the invention are particularly useful for coating of the reverse sides of pressure-sensitive adhesive tapes of paper and cellulose hydrate foils.

In the following examples, there are described several preferred embodiments to illustrate the invention. However, it should be understood that the invention is not intended to be limited to the specific embodiments.

Example I 264 gm. (1 mole) of fluorene succinic acid anhydride and 1 mole of octadecylamine were reacted together for 5 hours at 200° C. in a one-liter glass flask equipped with an air cooler and a stirrer. The reaction was completed after this time and the solid contents of the flask were poured out and pulverized. The raw product was recrystallized from a 1:1 mixture of toluene and methanol to obtain N-octadecyl-fluorene succinimide having a melting point of 84° C. and a nitrogen analysis of 2.80% (2.71% theoretical).

Using the same procedure except for the use of hexadecylamine and tetradecylamine, there was obtained, respectively, N-hexadecyl-fluorene succinimide, II, having a melting point of 78° C. and a nitrogen analysis of 2.74% (2.87% theoretical) and N-tetradecyl-fluorene succinimide, III, having a melting point of 74° C. and a nitrogen analysis of 3.01% (3.05% theoretical).

Example II 52.8 gm. of fluorene succinic acid anhydride and 96 gm. of hexadecylamine in 1 liter of toluene were refluxed in a 2 liter glass flask provided with a stirrer and an air cooler. The solvent was then distilled off and the raw product was recrystallized from a 1:1 mixture of xylene and toluene to obtain N,N'-dihexadecyl-fluorene succinic acid amide having a melting point of 143° C. and a nitrogen analysis of 4.10% (theoretical—3.86%).

Example III

A mixture of 2.45 kg. of melamine, 1.6 kg. of formalin (30%), 0.78 kg. of urea, 1.85 kg. of paraformaldehyde, 1.25 kg. of ethylene glycol and 1 kg. of water were heated together at 80° C. and a pH of 8.5 until a precipitation number of 5 was attained after which the mixture was rapidly cooled to room temperature to obtain a melamine-urea resin.

Example IV 1.26 kg. of melamine and 12 kg. of 30% Formalin in water were heated for 15 minutes at 80° C. and a pH of 8.5 and the mixture was then spray-dried. 1.25 kg. of this preliminary condensate was heated with 3.7 kg. of N-butanol at a pH of 4.5 and 70° C. for 30 minutes and the mixture was then neutralized and cooled to obtain an etherified preliminary melamine condensate.

Example V 80 gm. of the melamine-urea resin of Example III and 20 gm. of the etherified melamine condensate of Example IV were admixed with 0.5 gm. of phthalic acid anhydride and the various amounts of the N-substituted imides of fluorene succinic acid of Example I. The resulting emulsions were applied at a rate of 25 gm. per square meter to a strong sodium Kraft paper having a weight of 85 gm./m.² which was then dried at 140° C. to obtain a glossy film which adhered well to the paper and could be easily written upon. The reverse side of the coated paper was then coated in a known manner with an adhesive consisting of 20 parts by weight of natural rubber, 5 parts by weight of zinc oxide, 15 parts by weight each of polyterpene resin and colophonium, 5 parts by weight of oil soluble phenol resin and known stabilizers.

To test the adhesive strength of the coating of the invention in comparison with the adhesive, strips of adhesive papers 40 cm. long and 5 cm. wide were manually pressed onto the coated papers and the force required to remove the adhesive strip during one minute at an angle of 170° was determined. The adhesive strength in $p$ and in percent of paper coated only with melamine-urea resin and etherified preliminary melamine condensate are shown in Table I.

TABLE I

| Gm. of imide used | Adhesive strength in $p$ | Percent adhesive strength |
| --- | --- | --- |
|  | 615 | 100 |
| 5 mg. of I | 265 | 43 |
| 10 gm. of I | 215 | 35 |
| 5 gm. of II | 280 | 46 |
| 10 gm. of II | 215 | 35 |
| 5 gm. of III | 366 | 60 |
| 10 gm. of III | 315 | 51 |

Example VI

A mixture of 80 gm. of the melamine urea resin of Example III and 20 gm. of the etherified condensate of Example IV were admixed with 2.5 gm. and 5.0 gm., respectively, of N,N'-dihexadecyl fluorenesuccinic acid amide. The resulting mixtures were diluted with 50 cc. of toluene and the emulsions were applied to sodium kraft papers as in Example II at a rate of 20 gm./m.². The comparative decrease in adhesive strength was determined as in Example V. The values were 450 $p$ and 320 $p$ for 2.5 gm. and 5.0 gm. respectively of the said amide.

Various modifications of the invention may be made without departing from the spirit or scope thereof and it is to be understood that the invention is to be limited only as defined in the appended claims.

We claim:

1. A coating composition for providing cellulose-containing materials with a low adhesion coating consisting essentially of a film forming melamine-urea-lower alkyl aldehyde resin etherified with a lower alkyl polyol and 0.5 to 10 parts by weight per 100 parts by weight of melamine resin of a compound selected from the group consisting of an imide or diamide of fluorene succinic acid-(9) wherein the imide or amide nitrogen is directly bonded to a monovalent aliphatic or cycloaliphatic hydrocarbon radical of 5 to 22 carbon atoms.

2. The composition of claim 1 wherein film forming resin is the condensation product of 1 mole of melamine, 0.5 to 1.5 moles of urea and 4 to 7 moles of formaldehyde.

References Cited

UNITED STATES PATENTS 3,251,809  5/1966  Lockwood et al. _____ 260—75

HAROLD D. ANDERSON, Primary Examiner

R. J. KOCH, Assistant Examiner

U.S. Cl. X.R.

117—143; 260—29.4, 849